Mar. 27, 1923.

W. E. MUNSLOW.
CONNECTOR.
FILED JUNE 10, 1921.

1,450,108.

William E. Munslow, INVENTOR

BY Victor J. Evans
ATTORNEY

Patented Mar. 27, 1923.

1,450,108

UNITED STATES PATENT OFFICE.

WILLIAM E. MUNSLOW, OF STEUBENVILLE, OHIO.

CONNECTOR.

Application filed June 10, 1921. Serial No. 476,538.

*To all whom it may concern:*

Be it known that I, WILLIAM E. MUNS-LOW, a citizen of the United States, residing at Steubenville, in the county of Jefferson and State of Ohio, have invented new and useful Improvements in Connectors, of which the following is a specification.

This invention relates to connecting devices, and more particularly to a device specially adapted for connecting drinking fountains and other devices to a faucet.

One of the main objects of the invention is to provide a device of the character stated of simple construction and operation which may be readily applied to a faucet of standard construction, this device being adapted to receive a coupling nut for attaching a drinking fountain or other device to the faucet. A further object is to provide a device of the character stated of simple construction and operation which may be readily produced at small cost. Another object is to provide a device having means for insuring a fluid tight closure between the device and the end of the faucet. Further objects will appear from the detailed description.

Figure 1:
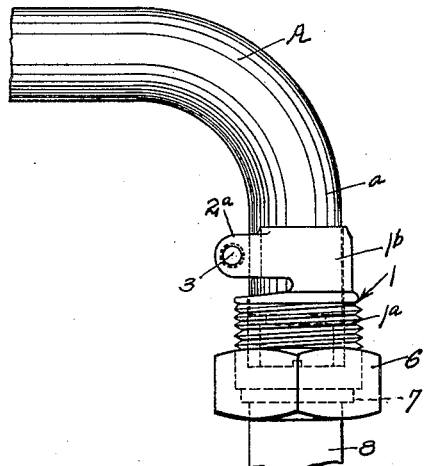
Figure 1 is a side view of the device as applied.
Figure 2:
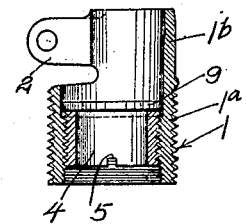
Figure 2 is a central vertical sectional view through the device.
Figure 3:
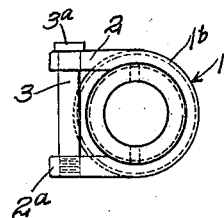
Figure 3 is a top plan view of the device.

The device illustrated in Figures 1 to 3 is intended to be used in connection with a faucet A of standard type the vertical arm *a* of which is straight and relatively long. In this form of the device I provide a sleeve 1 which is split at its upper portion and is provided with two integral ears 2 and $2^a$. Ear $2^a$ is bored and threaded to receive a securing screw 3, ear 2 being provided with an opening for reception of the shank of the screw the head $3^a$ of which bears against the outer face of ear 2. The body portion of sleeve or nipple 1 is interiorly threaded to receive an exteriorly threaded thimble 4 which is provided in its lower end with spaced notches 5 for reception of a suitable instrument for rotating the thimble. The body portion of the nipple is also exteriorly threaded for reception of a coupling nut 6 which engages beneath an annular flange 7 provided at the upper end of a tubular member 8 which it is desired to attach to the faucet A.

In practice the device is placed upon the lower portion of the vertical arm of the faucet with the lower end of this arm positioned within the upper portion of body $1^a$ of the device, a suitable packing ring or gasket 9 being placed upon the upper end of thimble 4. The securing screw 3 is then threaded through ear $2^a$ so as to secure upper portion $1^b$ of the device tightly about vertical arm *a* of the faucet. After the device has been thus secured in position thimble 4 is threaded into body $1^a$ so as to force gasket 9 tightly against the lower end of the faucet thus effecting a fluid tight closure between the same and the upper end of the thimble. Member 8 may now be readily attached to the faucet by means of coupling nut 6, and water discharged from the faucet will flow through gasket 9 and thimble 4 into member 8.

Figure 4:
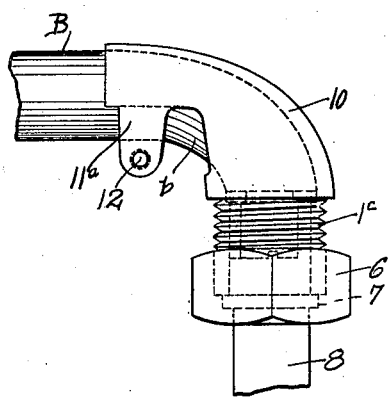
Figure 4 is a side view of a modified form of the device.
Figure 5:
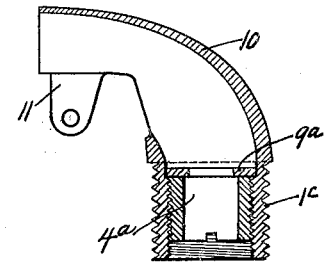
Figure 5 is a central vertical section through the form illustrated in Figure 4.
Figure 6:
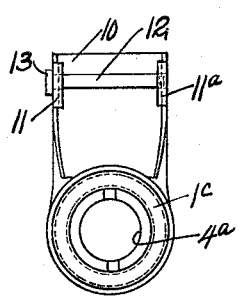
Figure 6 is an end view of the modified form illustrated in Figure 4.

The form of the device illustrated in Figures 4 to 6 is intended to be used in connection with a faucet B the outer arm *b* of which is relatively short and curved. In this form the device includes an exteriorly and interiorly threaded body $1^c$ from the upper end of which extends an elbow 10, this elbow being provided at its inner end with two integral depending ears or arms 11 and $11^a$. Arm $11^a$ is bored and threaded to receive a securing screw 12, and arm 11 is provided with an opening for reception of the shank of the screw which has a head 13 at one end which bears against the outer face of arm 11. A thimble $4^a$ is threaded into body $1^c$, and a gasket $9^a$ is positioned upon the upper end of this thimble. The device is secured upon faucet B by turning the screw 12 into arm $11^a$, the lower portion of arm *b* being positioned within the upper end of body $1^c$, after which the thimble is screwed into the body so as to force the gasket $9^a$ tightly against the lower end of the faucet. When the device has been thus secured member 8 may be readily attached to body $1^c$ by means of coupling nut 6 and flange 7 in the manner previously described.

As will be understood, and as indicated herein, slight changes may be resorted to in details of construction and arrangement of parts of the invention without departing from the field and scope of the same, and I intend to include all such variations, as fall within the scope of the appended claims, in this application in which the preferred forms only of my invention are disclosed.

What I claim is:—

1. In a device of the character described, a nipple, means for securing the same upon the outer end portion of a faucet, a gasket within the nipple, and means for forcing said gasket tightly against the outer end of the faucet for effecting a fluid tight closure therewith.

2. In a device of the character described, an exteriorly and interiorly threaded nipple, and means for securing the same upon the outer end of a faucet with the outer end portion of said faucet positioned within the inner end of the nipple.

3. In a device of the character described, an exteriorly and interiorly threaded nipple, means for securing the same upon the outer end portion of a faucet with the outer end of the faucet positioned within the inner end of the nipple, and a thimble threaded into the nipple for adjustment toward and away from the end of the faucet.

4. In a device of the character described, a nipple, means for securing said nipple upon the outer end portion of a faucet with the outer end of the faucet positioned within the inner end of the nipple, said nipple being interiorly and exteriorly threaded, a thimble threaded into said nipple, and a packing gasket positioned between said thimble and the outer end of the faucet.

In testimony whereof I affix my signature.

WILLIAM E. MUNSLOW.